UNITED STATES PATENT OFFICE.

VALENTINE HECHLER, OF CHICAGO, ILLINOIS, ASSIGNOR TO WILSON & CO., INC., OF CHICAGO, ILLINOIS, A CORPORATION OF NEW YORK.

ART OF COMPOUNDING FATS AND OILS.

1,389,947.  Specification of Letters Patent.  Patented Sept. 6, 1921.

No Drawing.  Application filed August 25, 1919. Serial No. 319,542.

*To all whom it may concern:*

Be it known that I, VALENTINE HECHLER, a citizen of the United States, residing at Chicago, in the county of Cook and State of Illinois, have invented a new and useful Improvement in the Art of Compounding Fats and Oils, of which the following is a specification.

The present invention relates to the art of compounding fats and oils and more particularly to the compounding of so-called "hard" fats such as animal or vegetable stearin with relatively large proportions of fluid oils such as the vegetable oils, cottonseed oil, soy bean oil, peanut oil, etc.

In accordance with the present invention a "hard" fat, such as animal or vegetable stearin may be compounded with from three to six times its weight of a suitable liquid oil such as cottonseed oil, peanut oil to produce a homogeneous mass or compound, grainy in texture, and in which no separation of liquid from solid fats will occur, the temperatures to which the mixture of fats are subjected during the various stages of the compounding process and the rate of change of the temperature of the compound being controlled during the process.

As an example of the compounding of fats in accordance with the present invention, a suitable quantity of stearin, for example, 100 pounds, may be melted up with from 4 to 6 times its weight of a liquid oil, for example, cotton seed oil, and the melted mixture cooled in a suitable receiver from its initial temperature, which may be approximately 212° F. and preferably while being agitated with an air blast or mechanical agitator, to a temperature slightly above the melting point of the stearin present, for example, from 106 to 115° F.

This initial cooling may be effected at a relatively rapid rate, for example, by the surrounding atmosphere or even by artificial refrigeration if properly controlled so the rate of cooling can be retarded at the proper temperature, as hereinafter described.

On reaching this temperature the mixture is subjected to mechanical agitation or beating while being cooled at a very slow rate to a temperature slightly below the temperature of crystallization of the stearin, for example, to a temperature of 90° F. or a few degrees thereabove. During this cooling and agitation the mixture becomes a homogeneous mass, having the appearance of a thick, creamy emulsion, which is allowed to flow into suitable containers or into trade packages to set; further cooling being effected by the surrounding atmosphere or, if desired, in an atmosphere chilled by artificial refrigeration.

It has further been found that the formation of the homogeneous, non-liquating compound is facilitated by adding to the still liquid mixture at or soon after the beginning of the slow cooling and agitating step a small amount of previously formed, substantially solid compound, hereinafter designated as a starter. If the vessel or container wherein the final compounding step is carried out has been previously utilized for the treatment of a similar batch, the solidified portions of the previous batch adhering to the cooled surfaces of the container may be utilized as the starter.

The slow cooling and agitating of the batch in the final compounding stage may be carried out by any suitable means so that it is extended over a period of 30 minutes to an hour or even longer, a period of 40 to 45 minutes being usually sufficient. The batch may suitably be cooled by the use of a surrounding jacket or coil of water maintained at a temperature of 10 to 20 degrees F. below the temperature to which it is desired to cool the batch, for example at 80° F. A suitable means for carrying out the process is illustrated in the patent to Mattheiss, No. 993,784, of May 30, 1911.

It is readily apparent that if the stearin used has a higher melting or crystallizing temperature than the ordinary stearin, as is the case with vegetable or hydrogenated stearin, the temperature at which the liquid mixture of stearin and oil is subjected to the final compounding operation must be correspondingly varied. The temperature at which the final operation is begun may in such case be 122° F. or even higher.

It is furthermore apparent that the stearin used may be incorporated in the form of a natural or artificial admixture thereof with softer fats or oils, such as beef tallow, etc., the proportion of such admixture used being proportionate to its stearin content.

Although the process of the present invention has been described in connection with certain specific details of temperature, time, etc. it is not intended that these details shall be regarded as limitations upon the scope of the invention, except in so far as they are included in the accompanying claims.

I claim:

1. In the process of compounding fats, oils, etc., slowly cooling a liquid mixture of stearin and oil from a temperature slightly above the melting point of the stearin to a temperature slightly below its crystallizing point in the presence of a small amount of substantially congealed mixture of stearin and oil and stirring the mixture during the cooling.

2. In the process of componnding fats, oils, etc., slowly cooling a liquid mixture of stearin and oil from a temperature of 106-115° F. to a temperature of about 90° in the presence of a small amount of substantially congealed mixture of stearin and oil and stirring the mixture during the cooling.

3. The process of compounding fats, oils, etc. which consists in rapidly cooling a melted mixture of stearin and oil to a temperature slightly above the melting point of the stearin while maintaining the homogeneity of the mixture, and slowly cooling the mixture from said temperature to a temperature below the crystallizing point of the stearin while agitating the mixture.

4. The process of compounding fats, oils, etc. which consists in rapidly cooling a melted mixture of stearin and oil in the proportions of 1 part stearin to 3-6 parts of oil to a temperature of 106-115° F., while maintaining the homogeneity of the mixture, and cooling the mixture from said temperature to about 90° F. in a period of about 30 minutes to one hour while agitating the mixture.

5. The process of compounding fats, oils, etc. which consists in rapidly cooling a melted mixture of stearin and oil to a temperature slightly above the melted point of the stearin while maintaining the homogeneity of the mixture, and slowly cooling the mixture from this temperature to a temperature slightly below the crystallization point of the stearin in the presence of a small amount of substantially congealed compound and stirring the mixture during said cooling.

VALENTINE HECHLER.